Jan. 13, 1970   F. B. HATEBUR   3,488,784
WORK HOLDING DEVICE
Filed Aug. 18, 1967   8 Sheets-Sheet 1

*INVENTOR*
FRIEDRICH BERNHARD HATEBUR

BY *Wenderoth, Lind & Ponack*
ATTORNEYS

INVENTOR
FRIEDRICH BERNHARD HATEBUR

BY Wenderoth, Lind & Ponack
ATTORNEYS

Jan. 13, 1970  F. B. HATEBUR  3,488,784
WORK HOLDING DEVICE
Filed Aug. 18, 1967  8 Sheets-Sheet 6

INVENTOR
FRIEDRICH BERNHARD HATEBUR

BY *Wenderoth, Lind & Ponack*

ATTORNEYS

F. B. HATEBUR 3,488,784

WORK HOLDING DEVICE

Filed Aug. 18, 1967

INVENTOR
FRIEDRICH BERNHARD HATEBUR

BY *Wenderoth, Lind & Ponack*

ATTORNEYS

United States Patent Office 3,488,784
Patented Jan. 13, 1970

3,488,784
WORK HOLDING DEVICE
Friedrich Bernhard Hatebur, Spiegelgasse 4,
Basel, Switzerland
Filed Aug. 18, 1967, Ser. No. 661,563
Claims priority, application Austria, Aug. 19, 1966,
A 7,922/66
Int. Cl. B23q 7/04, 17/02
U.S. Cl. 10—166                    16 Claims

ABSTRACT OF THE DISCLOSURE

A work holding device for conveying and simultaneously rotaing workpieces between adjacent stations of a punch and die press in which the workpiece is clamped between a pair of jaws, which are rotatable about their common axis in a support which is reciprocable in a direction transverse to such axis. At least one of the jaws is driven in rotation and an adjustment is provided to determine the extent of their rotation.

The present invention relates to a turning clamp on a reciprocating clamp support for conveying workpieces transversely on presses with pressing tools consisting of a lower die and upper die or punch and forming at least two working stations, the workpieces being conveyed from one position at one working station into a turned position at a following working station.

In the manufacture of bolts, nuts and moulded pressings, more especially in connection with cold and hot upsetting presses, it is known to use transverse conveyor arrangements by which the workpieces are turned through up to 180° for reasons of convenient working, by means of workpiece clamps or grippers as they travel from one working lower die to the next.

Two different types of workpiece clamps are known in respect of the transverse conveyors. With one type, two gripping fingers or clamping jaws are facing one another under pressure, for example, by a spring, and form a gripping jaw which is opened or widened by a workpiece, which can still just be pushed between the gripper fingers. With these "clamps" closed under pre-tension, the workpiece must be pushed out of the clamping mouth against the holding force of the clamps in order to be removed.

With the other type, the gripper fingers or clamp jaws are opened or closed by driving means, in order to grip and hold or free the workpiece. Several transverse conveyor arrangements with closed workpiece clamps are known, which effect the turning of a workpiece simultaneously with the conveying action as the said workpiece is moved from one working die to the next. Nevertheless, most of these devices comprise several parts and are complicated, and on account of the relatively heavy masses which they have and on account of the considerable mass forces, they only permit a limited quick working cycle of the press.

In one known transverse conveyor arrangement having closed turning clamps, which require comparatively few members for the turning movement and appear to be less complicated than the other hitherto known arrangements, the clamp support for the workpieces and moved towards and forwards for the conveying operation is formed as a sliding rail, which is held by one of its longitudinal sides in a guide body arranged on the working lower dies and projects with the other longitudinal side beyond the front of the lower die and rotatably supports spindles on the said longitudinal side, which spindles are arranged with their longitudinal axes perpendicular to the plane through the longitudinal axes of the lower dies (die axis plane). With the reciprocating movement of the clamp support, the spindles are rotated about their longitudinal axes by the fact that each spindle has thereon a gearwheel which engages in a straight rack fixed in position opposite the lower dies. Arranged on each spindle in front of the die opening are pairs of gripping fingers, between which the workpiece is pushed out of the lower die or from which the workpiece is pushed into the lower die.

In order that the conveying space between the lower die and punch or punch guideway can be made free when required from the sliding rail and the turning clamps, the guide body of this known arrangement is so mounted by means of studs or pins in bearings on the lower dies that the sliding rail and turning clamps can be moved away out of the conveying space by turning the guide body.

In one known arrangement, in which the spacing of the turning clamps from the front of the lower die is to be as small as possible at the time of transferring or delivering the workpieces, the gripper fingers are so chosen that they form a flat body, which is extended from the spindle axis and mainly on one side along a radius away from said axis. The direction of the conveying movement of such a clamp, the direction of rotation of the spindle and the direction of the radius in which the clamp is extended mainly on one side relatively to the spindle axis are so associated with one another that the turning clamp in the receiving station is so arranged that the said radial direction and the direction from the delivery station to the receiving station lie opposite to one another and the rotation of the spindle is so effected that the part of the clamp with the largest radius from the spindle axis is moved away from the front of the lower die in the transfer or receiving station and is moved towards the front of the lower die in the delivery station.

The transverse conveyor arrangement referred to has the disadvantage that it requires a broad space between the lower die and punch or punch guideway for the turning movement.

In addition, the construction comprising guide body, sliding rail and depending spindles in the said arrangement is complicated. It is a particular disadvantage that the clamps frequently become defective because of the receiving aperture springing, so that with the ejection of the workpiece from the die into the clamp, the latter is distorted and cannot be used with the next workpiece.

It is the object of the present invention to provide an arrangement for the turning clamp in which:

(1) The driving means for rotating the clamping jaw or one of the clamping jaws is adjustable as regards the start and end of the turning movement, so that the turning can be established at certain positions between two lower dies, (2) A frame-like, strong clamp support can be used, so that the said damage to the clamps is avoided, (3) It is possible to work with a closed clamp opening or with clamping jaws which are positively opened and closed, and (4) The conveying action from one lower die to the next before and after the turning operation can comprise a translatory movement away from the front of the lower die and back again to the said front.

The turning clamp according to the invention on a reciprocating clamp support for the transverse conveying of workpieces on presses with pressing tools forming at least two working stations and consisting of a lower die and punch, the movement being from a position at one working station in a turned position at a following working station, is fitted with two facing clamping jaws, of which at least one clamping jaw is rotatable during the reciprocating movement by a driving means about a centre line of rotation and at least one clamping jaw is movable at least approximately in the direction of its centre line of rotation, either to such an extent that a workpiece, by overcoming a counteracting pressure on the clamping jaw, is adapted to be pushed between the clamping jaws or to be pushed out from its position between the clamping jaws, or is constructed to be movable by an arrangement for opening and closing the turning clamp, and is characterized in that the driving means for rotating a clamping jaw are so arranged that the start and end of the turning movement are adjustable.

The turning clamp according to this invention is advantageously arranged on a clamp support, which is made as a frame between its two bearing ends and is provided with two longitudinal beams parallel to one another, the two longitudinal beams being so provided for the arrangement in the transverse conveying space or its lateral space extension, which extends perpendicular to the plane of the lower die axis, or laterally of the space extension above and below the pressing tools, that they are self-supporting in the region of the pressing tools, and is characterized in that a clamping jaw of the same turning clamp is supported on each longitudinal beam.

Embodiments of the arrangement according to the invention are shown by way of example in the accompanying drawing and are hereinafter more fully described by reference to the drawing, wherein.

Figure 1:
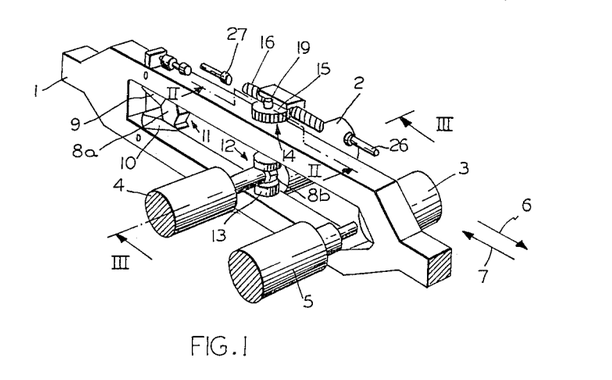
FIGURE 1 is a diagrammatic and perspective view of a clamp support or carriage having a holding clamp and having a turning clamp according to the present invention.
Figure 2:
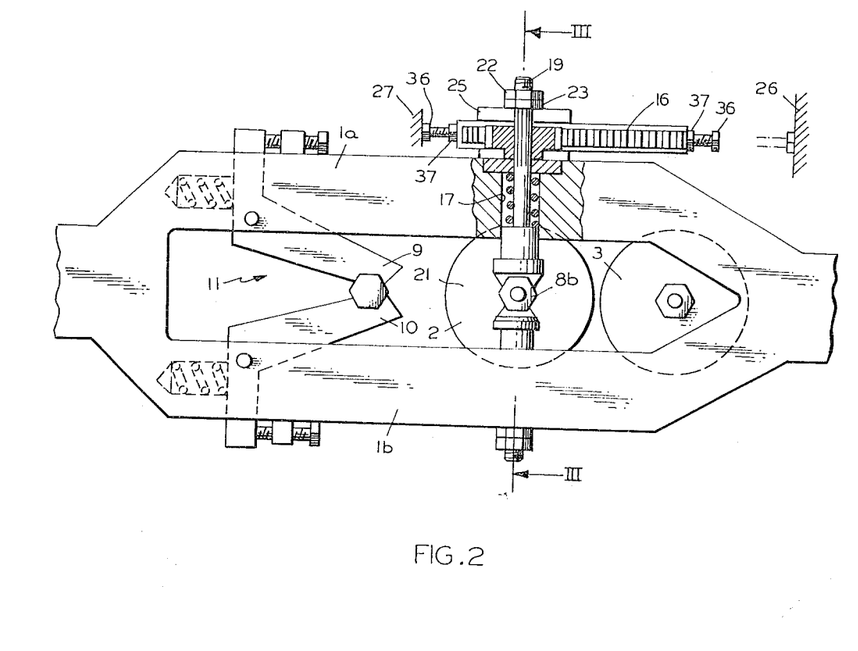
FIGURE 2 is a diagrammatic side elevation to a larger scale of the clamp support according to FIGURE 1, with the turning clamp according to the invention shown partly in section on the line II—II of FIGURE 1.

In FIGURES 1 and 2, the reference 1 shows a frame serving as a clamp support for a nut press, of which two lower dies 2, 3 and two upper dies or punches 4, 5 can be seen. The clamp support 1 is moved backwards and forwards in the direction of the arrows 6, 7 in front of the die openings and in the conveying space of the press, in order to convey the workpiece 8b from the die 2 to the die 3.

In the clamp support 1, a holding clamp 11 consisting of the two parts 9, 10 is shown on the left in FIGURES 1 and 2, the purpose of said clamp being to transfer the workpieces, of which a workpiece 8a to be machined is shown in FIGURE 1, in a manner not shown from a supply channel or a cutting machine and bringing it without any turning action in front of the first working die.

Figures 3, 4:
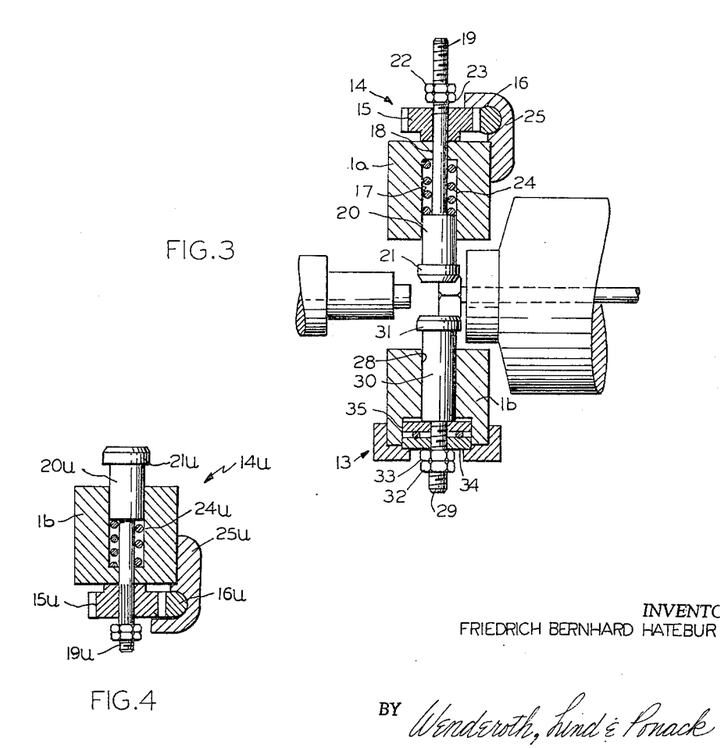
FIGURE 3 is a diagrammatic view of a part of the turning clamp, partly in section on the line III—III of FIGURE 2.
FIGURE 4 is a sectional view according to FIGURE 3, for showing the lower half of a turning clamp, in which both halves of the clamp are positively turned by a rack drive.

The turning clamp 12 shown to the right of the holding clamp 11 consists, according to FIGURE 3, of the lower part 13, the upper part 14 with the gearwheel 15, and the rack 16.

In FIGURE 3, the upper part 14 is shown in section along the line III—III of FIGURE 2. According to this view, a spindle 19 is seated in a bore 17 which is arranged in the upper beam 1a of the clamp support 1 and which is narrower in its upper part 18, the said spindle having fixedly arranged on its lower end a thickened head 20 with a clamping jaw 21. Seated on the upper end of the spindle 19 is the gearwheel 15, which is held by means of nuts 22, 23 on the spindle and is secured by grooves and projections on the gearwheel and spindle, respectively, against turning relatively to the spindle. A helical spring 24 is fitted into the bore 17 between the shoulder of the latter and the shoulder on the head 20, this spring being so compressed that it forces the clamping jaw 21 downwardly with a pressure which is sufficient for holding a workpiece 8 in the turning clamp 12, but still permits the workpiece to be forced by the ejector from the working die between the clamping jaw 21 and its co-operating jaw. The lowest position of the clamping jaw is determined by the nuts 22, 23, which bear against that gearwheel arranged on the beam 1a and have the effect that the clamp opening cannot be closed further than to a distance which corresponds to the dimension of the workpiece to be pushed by the ejector of the die between the clamp jaws. The spindle 19 is freely rotatable in the upper beam 1a of the frame 1 with the head 20 and clamping jaw 21, gearwheel 15 and nuts 22, 23.

The gearwheel 15 engages in a rack 16, which is arranged on the frame 1 parallel to the reciprocatory movement of the latter and is so mounted for displacement longitudinally in a holder 25 fixed on the clamp support 1 during its translatory movement. Arranged in the path of movement of the rack 16 are two abutments 26, 27 (FIGURES 1 and 2), which are supported in a fixed but adjustable position on the frame of the press or on the dies in a manner not shown.

As regards the lower part 13 of the turning clamp 12, and as shown in FIGURE 3, a spindle 29 with an upper thickened head 30 and a clamping jaw 31 on the head is mounted in a bore 28 in the lower beam 1b of the clamp support 1. Fixed on the bottom end of the spindle by means of nuts 32, 33 is a ballbearing 34, which is arranged in a recess or widened portion 35 of the bore 28 on the underside of the beam 1b. By contrast with the spindle 19, the spindle 29 does not have a direct drive.

Nevertheless, the lower part of the turning clamp 12 can also have the form which is shown in section in FIGURE 4, in which the lower part 14u corresponds with lateral inversion to the upper part 14, with the sole difference that, instead of the resiliently yieldable spring 24 of the upper part 14, a stiffer setting spring 24u is provided in the lower part, it being possible by the spring 24u and in a manner not shown for the lower clamp jaw 21u to be adjustable in its height in relation to the upper clamping jaw 21.

When a lower part 14u is used, a lower rack 16u and abutments 26u and 27u (FIGURE 7) corresponding to the abutments 26 and 27 for the upper part 14 of the turning clamp 12 must be provided.

When the turning clamp for the lower part 13 does not have a positive drive means, the lower part, when a workpiece is coveyed by the upper part 14, is also carried in the turning movement because of the pressure exerted by the upper part through the workpiece held in the clamp on to the lower part. With the reverse movement from the working die 3 to the working die 2, only the upper part of the turning clamp is rotated, because there is no workpiece between the clamp jaws. The lower part remains in its position.

When the turning clamp also has a rack drive means for the lower part 14u, and also the lower part of the turning clamp is turned in its position with the return movement.

In order to make the instant of starting and ending the turning operation adjustable, the rack 16 is provided at both ends or at each abutment with a bore (not shown) into which a headed screw 36 (FIGURE 2) is adapted to be screwed and is adapted to be secured in its position by a locking nut 37 (FIGURE 2).

Figure 5:
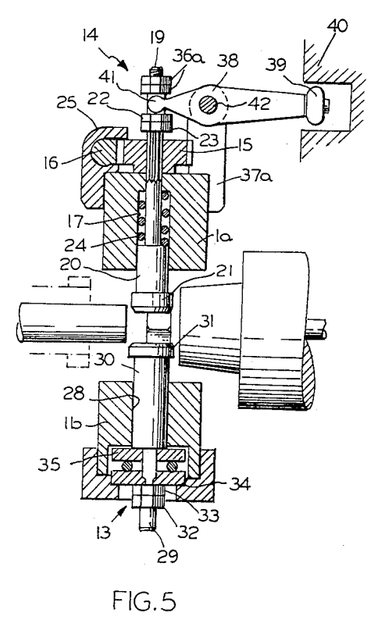
FIGURE 5 is a section perpendicular to the direction of movement of the reciprocating clamp support and an elevation along the centre line through the clamp spindles of a turning clamp, in which the upper clamp half comprises a drive means for the opening and closing of the clamp and for the positive turning movement, and the lower clamp half comprises a rotatable spindle which is adjustable in height, as in FIGURE 3.

FIGURE 5 corresponds substantially (see references) to FIGURE 3 which has already been described. Since the turning clamp of FIGURE 5 is to be positively opened and closed, the upper half 14 of the turning clamp 12 has a holder 37a, which is fixed on the beam 1a and is supported on a double-armed lever 38. The lever 38 travels with one of its ends 39 in a rail 40 and is secured on the upper end of the spindle by its other end 40 by means of two nuts 36a or setting discs. By raising or lowering the rails of the upper part and/or of the lower part (which then must be of corresponding construction), the associated clamping jaw can be moved in the direction for closing or opening the clamp.

Figure 6:
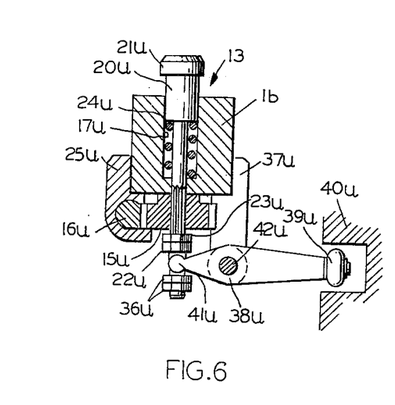
FIGURE 6 shows a clamp half which can be used instead of the lower clamp half according to FIGURE 5, the former clamp half being positively driven for the turning movement and for the opening and closing movements.

FIGURE 6 shows the lower part 13a, which is similar to the upper part 14, but laterally inverted, as described above, and is provided in accordance with the last preceding paragraph with a means for the positive opening and closing operation.

The manner in which the turning clamp as described herein operates (FIGURE 7) can be summarized as follows.

Figure 7:
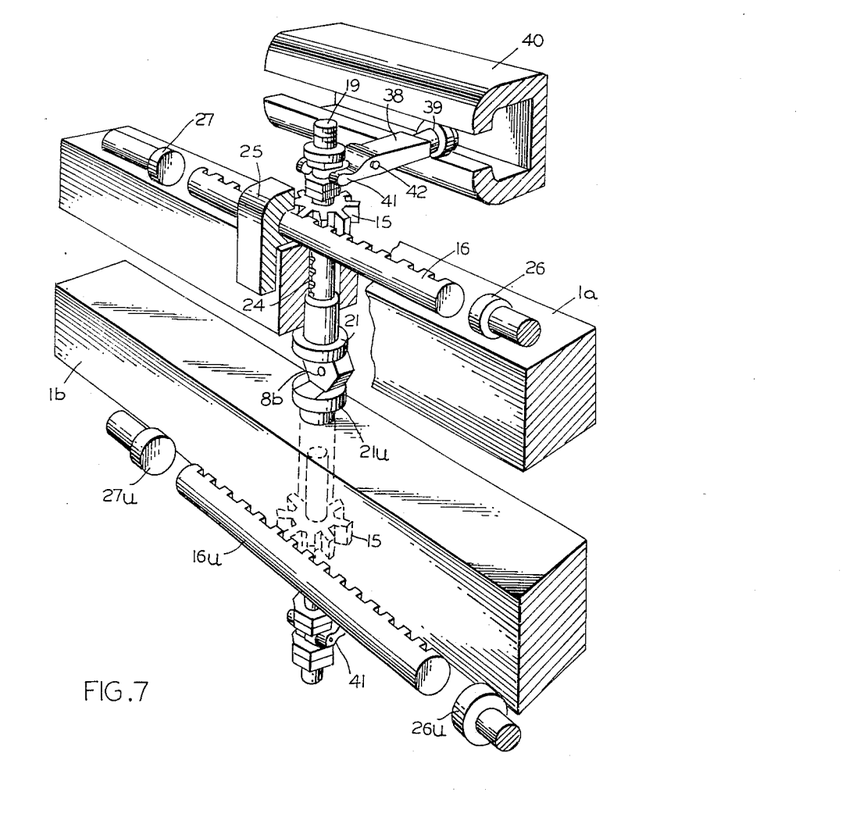
FIGURE 7 is a simplified diagrammatic perspective view to a larger scale, partly in section, showing the essential parts of a turning clamp, in which both the upper and the lower halves of the turning clamp are positively moved for the turning operation and also for the opening and closing operations.

The reciprocating clamp carriage for conveying the workpieces in the space in front of the die openings, which carriage supports the turning clamps, moves said clamps from a die opening to the next and back again. In the position in front of one die opening, the opened turning clamp receives the workpiece, it being closed under the action of the spring 24 of the upper and/or lower part of the turning clamp after being freed by the actuating rail 40. With movement of the clamp carriage, in order to bring the turning clamp to the next working station, the rack 16, after travelling through an adjusted distance, bears with the surface which is in front in the direction of movement against an abutment 26 or 27, is stopped and thus rotates the gearwheel 15 until the turning clamp is turned through 180° and the turning clamp is situated in front of the next die opening. By actuating the rail 40, the clamp is opened, so that the workpiece can be received by the device provided or can be pushed by the lower clamping jaw. The closing of the clamp can be effected before the return travel in front of the first die opening or also after return travel to the said position and recharging of the lower clamping jaw with a workpiece.

For the clamping jaw forced under the pressure of the spring 24 into the closed position or the spindle carrying the clamping jaw, an adjustable stop (not shown) can be provided, so that the clamping jaw, on closing the clamp, when there is no workpiece in the clamp, does not necessarily have to be completely closed and again open to the full width.

FIGURE 7 is a perspective view, partly in section, showing the turning clamp according to FIGURE 5, but with the lower half of the turning clamp according to FIGURE 6. In FIGURE 7, the double-armed lever 38 is shown without support, but nevertheless this corresponds to the holder 37 shown in FIGURE 5. Instead of providing a holder 25 for holding the rack 16 and for engaging over the gearwheel 15 and the said holder 37, both parts can also be combined to form one element by the holder 25 having an attachment for supporting the pivot pin for the double-armed lever 38 and, in FIGURE 5, being arranged for example on the right side of the lever 38.

Figure 8:
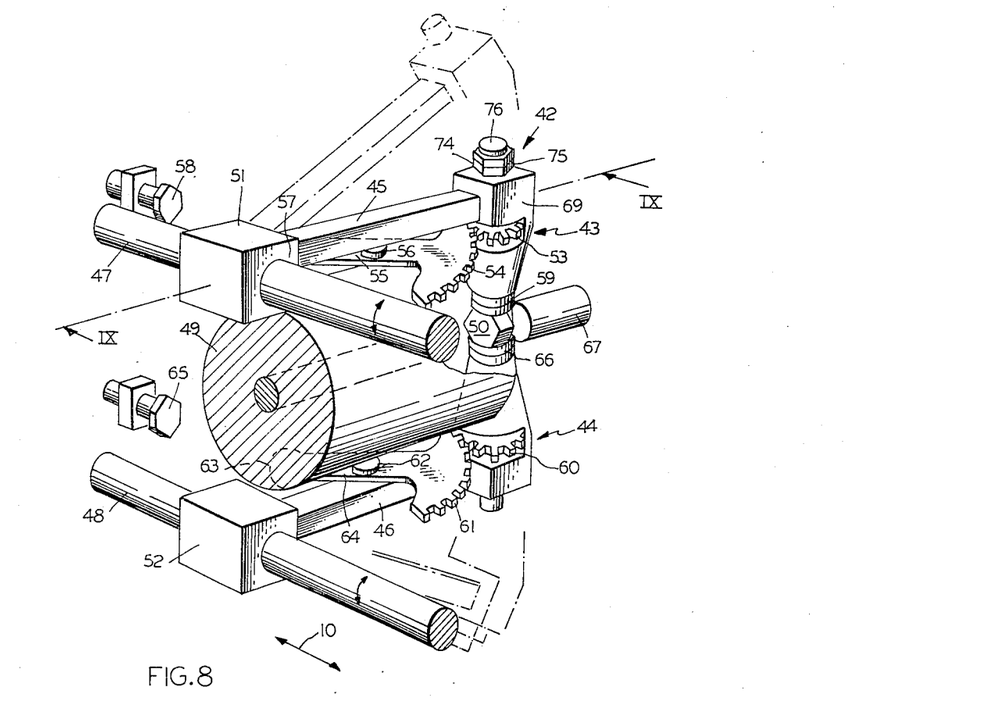
FIGURE 8 is a diagrammatic perspective view of a lower die with its punch and, between the latter, a turning clamp which is held by cantilever arms which are mounted on supports which can form parts of a clamp carriage.

FIGURE 8 shows diagrammatically the principle of the construction of a turning clamp, of which the upper and lower halves 43 and 44, respectively, are each supported by a cantilever arm 45 and 46, respectively, on the upper and lower beam 47 and 48, respectively, of a clamp support outside the transverse conveying space. The die 49 is shown broken away at its upper front part in order that the workpiece 50 is made visible in its position between the two halves of the turning clamp in front of the die. Other dies can be located to the right and left of the die 49 between the two beams 47 and 48 or the dies can form a block between the beams 47 and 48.

The two beams 47 and 48 can be connected to one another on the right and left, so that they form a single frame-like clamp support, which is moved backwards and forwards, or they can be so guided that they are movable backwards and forwards by a single drive means in synchronism and parallel to one another, simultaneously in the same direction as indicated by the arrow 10.

The two cantilever arms 43, 44 are fixed on the associated beams 47, 48 by means of locking members 51 and 52, respectively, which are arranged on the beams so as to be fast in rotation and displacement therewith, so that the upper and lower halves of the turning clamp are movable towards one another and away from one another by rotation of the beams constructed as shafts in opposite directions of rotation for opening and closing the clamp.

As shown in FIGURE 8, the upper half 43 of the turning clamp comprises a gearwheel 53, which is in mesh with the teeth of a gear segment 54. The gear segment is made T-shaped and is provided on the cross member of the T with the teeth. The other or main arm 55 of the T is mounted to be rotatable approximately at mid-length on a stud 56, which is arranged in FIGURE 8 on the underside of the cantilever arm 45. That end 57 of the main arm 55 which is remote from the transverse arm is made spherical and, with forward and backward movement of the supporting beam 57, supporting arm 45, gear segment 54 and the upper clamp half 43, serves to rock the gear segment 54 about its bearing stud 56 by bearing against an abutment 58 arranged in the path of movement of the end 57, and thereby to rotate the clamping jaw 59 of the turning clamp through 180° as will later be shown.

As shown in FIGURE 8, the lower arm 46 corresponds to the upper arm 45, but in laterally inverted form, i.e. a gear 60 meshes with a gear segment 61 which is made T-shaped, is mounted on a stud 62 and is rocked by means of the end 63 of the main arm 64 of the T on bearing against the abutment 65, in order to rotate the lower clamping jaw 66 through 180°.

FIGURE 8 shows the turning clamp 42 in its position between the die 49 and the punch 67. In the practical installation, another die (not shown) would be located on the left of the die 49 in FIGURE 8. With movement of the turning clamp of this die imagined to be further towards the left in FIGURE 8 into the position in which it is shown in FIGURE 8, the ends 57 and 63 of the gear segments 54 and 61 must bear against stops for turning the clamp 42, the said stops being opposite the stops 58 and 65 and having been omitted in the drawing for reasons of better clarity.

Figure 9:
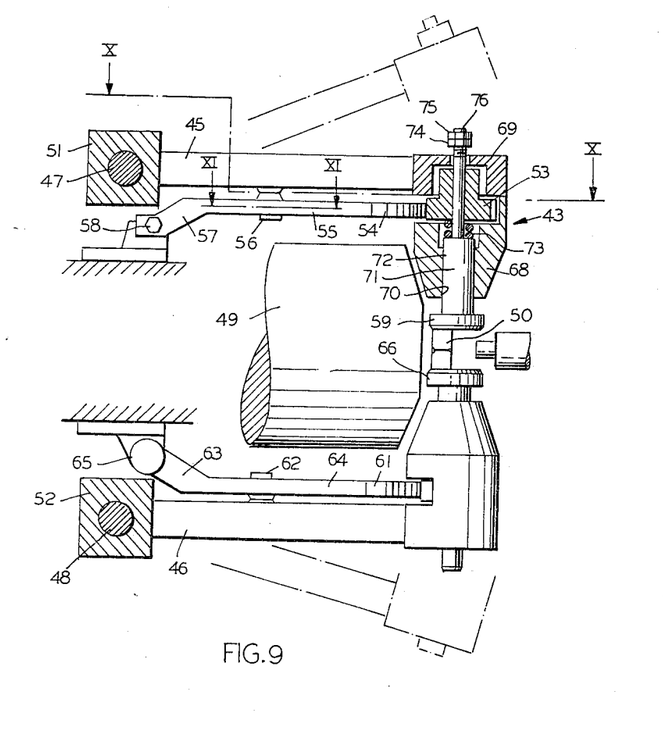
FIGURE 9 is a perspective side elevation of the clamp support with cantilever arms and a turning clamp according to the invention, partly in section along the line IX—IX of FIGURE 8, in the direction of the arrows.

FIGURE 9 shows an elevation of the turning clamp with the components carrying it in section on the line IX—IX of FIGURE 8.

As will be seen from FIGURE 9, the upper half 43 of the turning clamp 42 has a sleeve 68, which is fixed in a manner not shown on the end 69 of the cantilever arm 45. A spindle 71 with a thickened portion 72 on which is arranged the calmping jaw 59 is fitted in a central bore 70 extending through the sleeve 68 so as to be rotatable relatively to the said sleeve. According to FIGURES 8 and 9, the gearwheel 53 is arranged at the upper end of the spindle. The spindle and gearwheel are displaceable relatively to one another in the longitudinal direction of the spindle. Between the shoulder of the spindle, which is formed by the thickened portion 71, and the gearwheel 53 arranged on the spindle, there is provided a cylindrical compression spring 73, which tends to force the clamping jaw 59 into its lowest position, which is determined by nuts 74, 75, which are screwed onto the threaded end 76 of the spindle, or the abutment against the opposite clamping jaw 66 or a stop for limiting or setting the lowest position.

Figure 10:
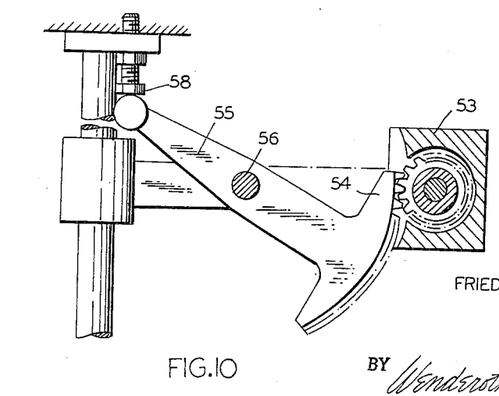
FIGURE 10 is a partial diagrammatic view of a part of the arrangement, partly in section on the line X—X of FIGURE 9, seen in the direction of the arrows X.

The abutment or stops 58, 65 are fixed in relation to the die. As shown in FIGURE 10, they are adjustable in order to be able to adjust the turning of the clamps as regards the instant at which the turning operation commences.

Figure 11:
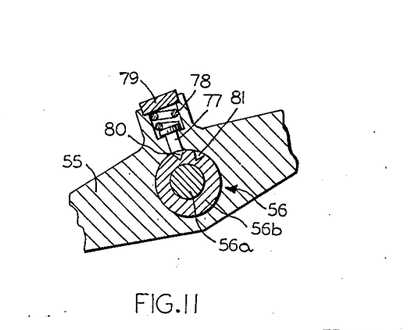
FIGURE 11 is a diagrammatic view to a larger scale showing a centering arrangement for the two extreme positions of a swivellable driving lever for the turning clamp drive, this being a section on the line XI—XI of FIGURE 9, seen in the direction of the arrows XI.

In order that the angle through which the turning clamp is to be rotated or in order that the end position into which the clamps are rotated can be reliably established free from play, a centering pin 77 is provided in a recess if the main arm 55 of the T according to FIGURE 11, the said pin being forced under the action of a cylindrical compression spring 78 against the stud 56. The spring 78 is held tensioned by a cap 79 which is positioned on the recess and is fixed on the arm 55 by screwing or clamping. The centering pin 77 is forced with its point into one of conical recesses 80, 81 provided on the stud 56, so that it guarantees the corresponding end positions of the turning clamp being reached in the turning operation, because the recesses are in the end positions.

In order that a precision setting at the correct turning position of the turning clamps is possible after the reciprocatory movement, the stud 56, as shown in FIGURE 11, can be subdivided into a thinner inner stud 56ᵃ and a ring 56ᵇ, the ring 56ᵇ which carries the conical recesses being rotatable as desired in relation to the stud 56ᵃ and being adapted to be secured relatively to the inner stud in the rotated position in a manner not shown.

The turning clamp as previously described can receive the workpiece by the clamp jaws 59, 66 being adjusted to a relative spacing which is somewhat smaller than corresponds to the height of the workpiece 50 to be gripped by the said jaws. The workpiece can then be forced against the pressure of the spring or springs 73 between the clamp jaws or can be forced out from the position between said jaws.

However, the arrangement described can also be designed to provide for a positive opening and closing of the turning clamp. For this purpose, it is sufficient to make the upper beam 47 in such a way that it is rotatable about its centre line and thus a rocking of the cantilever arm 45 is made possible. Instead of only making the beam 47 rotatable, both beams 47 and 48 can be designed so that they can rotate, so that the cantilever arms 45, 46 and with them the two turning clamp halves 43, 44 are capable of rocking away from one another for opening the clamp and towards one another for closing the same.

Instead of the two halves of the turning clamp being positively rotated through a gearing during the forward and backward movement in order to turn the workpiece, it is also sufficient for only one half of the turning clamp to be provided with such a gearing.

In FIGURE 12, the frame 1 is again formed as a clamp support according to FIGURE 1 between dies and punches and carries a turning clamp which, as already described, could be turned by an adjustable gearing, as described in connection with FIGURE 1.

Figure 12:
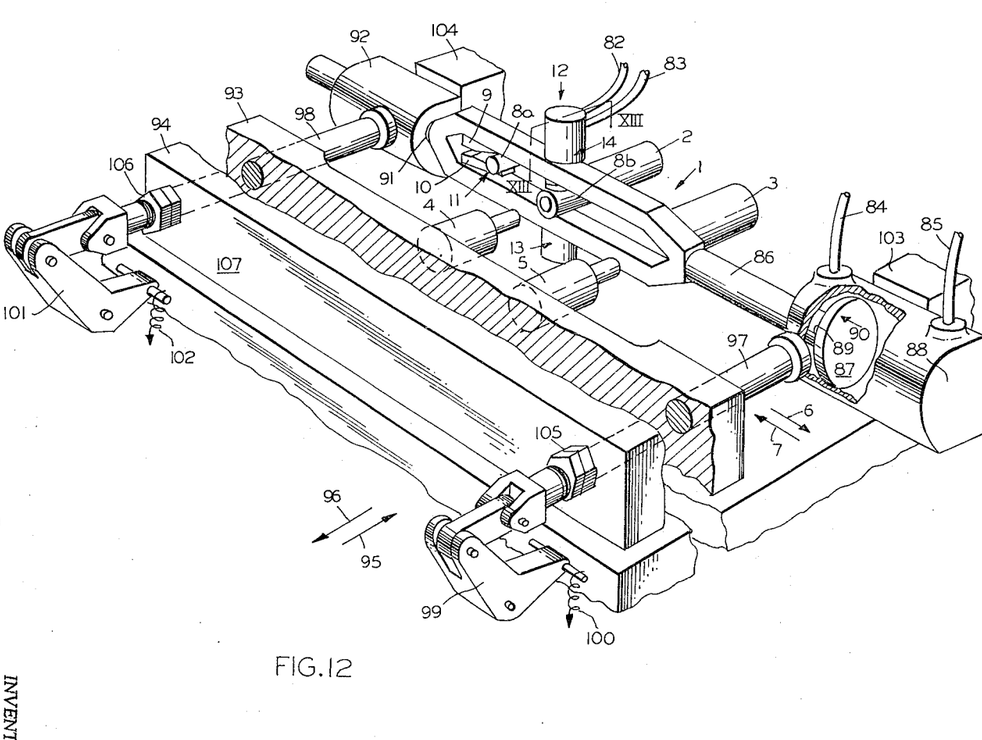
FIGURE 12 is a diagrammatic perspective view of a reciprocating turning clamp support in the form of a closed frame, which is also displaceable in the transverse direction, with the devices which displace the turning clamp support longitudinally and transversely.
Figure 13:
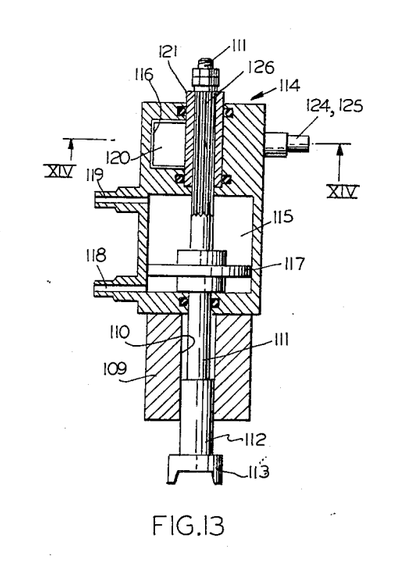
FIGURE 13 is a sectional view to a larger scale perpendicular to the length of a clamp support through the upper beam thereof and through the upper half of a turning clamp rotated by means of compressed air, as indicated in FIGURE 12.
Figure 14:
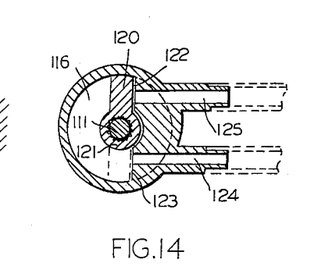
FIGURE 14 is a sectional view through the upper half of the turning clamp according to FIGURE 13, along the line XIV—XIV in FIGURE 13.

However, the turning operation can also be effected by means of compressed air, as indicated in FIGURE 12 by the supply hose 82 for the supply of compressed air to the turning clamp 12 and a discharge hose 83. A turning clamp to be operated by compressed air is shown in FIGURES 13 and 14.

In FIGURE 12, the clamp support 1 has on its right end an extension 86 which ends in a piston 87. The piston 87 is arranged inside a compressed air cylinder 88 with compressed air connections 84, 85 and is moved under the action of the compressed air, which is delivered with correct timing alternately through the supply lines 84, 85 to one or other side 89, 90 of the piston 87.

The extension 91 of the clamp support 1 shown on the left in FIGURE 12 is arranged in a bearing 92 for reciprocatory movement.

In order to receive the workpiece 8b which, after the pressing operation in the die 2, is ejected from the latter, the turning clamp must in the rest position be arranged close by the opening of the die 2. When the workpiece is elongated, as shown in FIGURE 12, it is necessary for carrying out the turning operation, i.e. the turning of the workpiece through up to 180°, for the turning clamp, before turning, to be guided away from the front of the die. Since the turning preferably takes place during the time period for the transverse conveying of the workpiece from the position in front of the discharging die into the position in front of the next working die which is to receive the workpiece, the clamp support 1, before the movement from the position shown in FIGURE 12 towards the left perpendicularly of its length direction and perpendicularly of the front side of the die 2 is advantageously moved away from the latter. The support 1 is then moved towards the right into a position in front of the die 3, which corresponds to the position in front of the die 2 after the movement perpendicularly away from the latter, in order then to be moved up to the die 2 in a direction opposite and parallel to the direction of the movement away from the die 2 to in front of the die 3.

For carrying out the translatory movement of the clamp support 1 perpendicularly of the front side of the dies 2 and 3, the support 1, together with its extensions 86, 91 and with the cylinder 88 and also the bearing 92, is arranged to be displaceable parallel to the die axis plane.

In FIGURE 12, the press carriage supporting the punches 4, 5 is illustrated by parts 93, 94. The press carriage is displaceable in the direction of the arrows 95, 96 towards the dies and away from the latter. According to FIGURE 12, a rod 97 and a rod 98 are mounted in the press carriage 93, 94 and are displaceable longitudinally in these mountings or bearings. The rod 97 is positioned with one end against the cylinder 88 and at the other end on an elbow lever 99, which is held by a spring 100 in such a direction of rotation under tension that the rod 97 exerts a pressure in the direction of the arrow 95. In corresponding manner, the rod 98 is arranged with one end against the bearing 92 and with the other end on an elbow lever 101, which is held by a spring 102 in such a direction of rotation under tension that the rod 98 exerts a pressure in the direction of the arrow 95.

As will be seen in FIGURE 12, two abutments 103, 104 are provided, these limiting the movement which the cylinder 88 tends to make under the action of the spring 100 and the bearing 92 tends to make under the action of the spring 102 in the direction of the arrow 95. With the cylinder 88 and bearing 92 abutting against the stops 103, 104, the support 1, in the rest position is to hold the opening of the turning clamp directly in front of the die openings and aligned with the latter. In order to make this position finely adjustable, the stops 103, 104 can be adjustable in the direction of the arrows 95, 96.

In order that the rods 97, 98 mounted in the press carriage 93, 94 and serving for the movement of the support 1 are moved perpendicularly of the front side of the dies in the direction of the arrow 96, as is necessary before the rotation of the turning clamps in the manner described above, setting rings 105, 106 are arranged on the rods 97, 98, by means of which rings the rods 97, 98 are carried by the press carriage in the direction of the arrow 96. The setting rings are adjustable in a position between the rear side 107 of the press carriage 93, 94 and those ends of the rods 97, 98 which bear against the elbow levers 99, 101. The path through which the turning clamp is moved, before the turning operation, by the front of the die in a direction perpendicular to the latter is established by the adjustment of the setting rings 105, 106.

FIGURES 13 and 14 show on the upper arm 109 of a support 1 the upper half of a turning clamp, with which the rotation and the lifting and lowering of the clamping jaw can be effected by means of a flow medium, e.g. compressed air.

According to FIGURE 13, the upper arm 109 of the clamp support 1 has a bore 110 which extends therethrough an in which is arranged a spindle 111 with a thickened lower end 112, which carries a clamping jaw 113. Arranged on the upper arm 109 is a housing 114 with two chambers 115, 116. The spindle extends through both chambers.

Located in the chamber 15, which is cylindrical, is a flat circular piston 117, which is fixed on the spindle so that it cannot be turned or displaced thereon. The chamber 115 is closed on all sides and has a pipe connection 118 at the lower end and a pipe connection 119 at the upper end. By introduction of a flow medium through the pipe 118, the piston can be raised and thus the clamping jaw can be lifted, and by introduction of flow medium through the pipe 119, and with opening of the pipe 118 for discharge, the clamping jaw 113 can be lowered and, by maintaining the pressure through the pipe 119, the jaw can be held under downwardly directed compressive force.

The chamber 116 forms a part of a circular cylinder, in which the spindle 111 extends through the cavity. The centre lines of the cylinder and spindle coincide. In the chamber, the spindle has fixed thereon a vane 120 which extends radially from the spindle as far as the chamber wall and fills the full height of the chamber, said vane being turnable with the spindle. In its two end positions, the said vane is able to bear against a wall 122, 123 which extends from the cylinder wall as far as the hub 121 of the vane and which bears with a sealing action against said hub, and a flow medium can discharge from a pipe 124 or 125 against the vane or into the space between the vane or into the space between the vane and wall, in order to turn the said vane clockwise or counterclockwise.

The end positions of the vane are so chosen that the vane is adapted to swivel through at least an angle of 180°. However, stops or abutments can be provided on the spindle outside the chamber, which enable the angle to be adjusted to a smaller or larger value.

In order that the spindle with the piston 117 can be raised and lowered, the vane 120 can be displaceable on the spindle and longitudinally of the latter by means of grooves and projecting ribs 126 on the vane hub and spindle, respectively.

Figure 15:
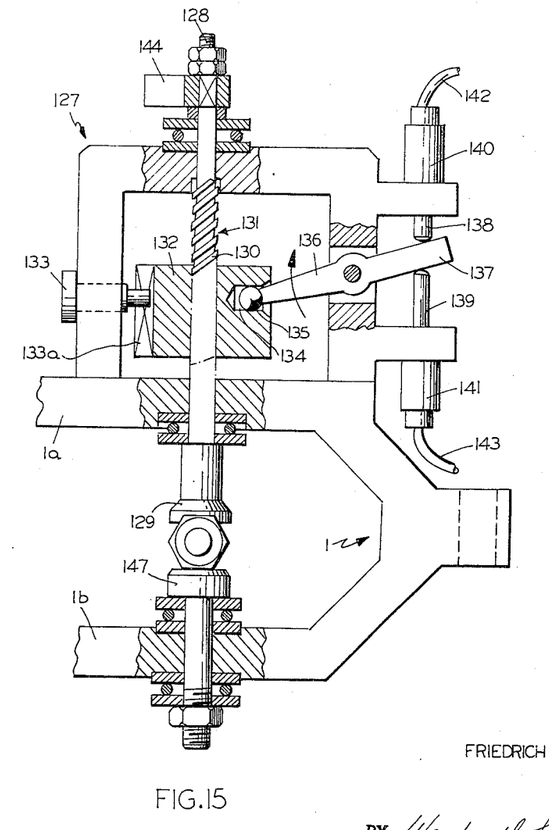
FIGURE 15 is a view to a larger scale and partly in section of another constructional form for a turning clamp arrangement which can be actuated by a flow medium.

FIGURE 15 shows another constructional example of a driving means for turning a closed workpiece clamp for the transverse conveying movement of workpieces.

According to FIGURE 15, the upper beam 1a of the clamp support 1 has arranged thereon a structure 127 which, together with the beam 1a serves as a mounting for a driving shaft 128 which carries at its lower end the clamping jaw 129 and is provided in its middle portion 130 with a comparatively steep thread 131, with which engages a block nut 132. The said nut 132 is secured against turning movement by a stop pin 133, which engages in a groove 133a of the nut 132. Provided diametrically opposite the groove 133 in the nut 132 is a bore 134, in which engages one end 135 of a two-armed lever 136, of which the other end 137 is adjustable backwards and forwards by the ends 138, 139 of two pistons (not shown), which are arranged in two cylinders 140, 141 and which can be actuated by flow media. The flow media is supplied through control pipes 142, 143 to the cylinders and the pressure thereof can be regulated.

Figure 16:
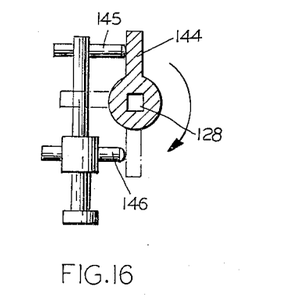
FIGURE 16 shows a setting means for the angle of rotation during the turning movement and showing its relative position.

Mounted on the upper end of the shaft 128 is a movable vane 144, for which stops 145, 146 are provided, in accordance with FIGURE 16, with said stops being adjustable to limiting positions for the forward and backward movement of said vane. They can be utilized in a manner not shown for automatically controlling the supply of pressure to the control pipes 142, 143.

The clamping jaw 147 which is shown in the lower beam 1b and which is rotatably mounted does not have its own drive means. It could also be positively driven concurrently with the upper shaft or by its own driving arrangement.

The driving of the upper clamping jaw 129 can be effected in FIGURE 15 from the position shown by pressurized fluid being introduced through the pipe 142 into the cyinder 140. As a result, the end 138 of the piston rod is moved downwardly and the nut 132 is forced upwardly by the lever 136, the shaft 128 rotating in a clockwise direction in FIGURE 16 until the vane 144 bears against the stop 146 and shuts off the pressure in the pipe 142 and in the cylinder 140, e.g. by opening a valve.

The operation of the arrangement shown in FIGURE 12 for the transverse conveying and turning of for example elongated workpieces on presses is as follows:

A machined workpiece 8b to be delivered by the die 2 is ejected from the die and transferred to the turning clamp 12.

With the turning clamp according to FIGURES 2 to 4, this is effected by the workpiece 8b being forced against the pressure of the springs 24 and possibly 24u between the clamping jaws of the turning clamp. With the turning clamp according to FIGURES 5 to 10, the transfer can be effected with positive opening and closing of the clamping jaws, and this can be produced by actuating the rails 40 or by supply of pressurized fluid.

From this first position, in which the turning clamp 12 has taken over the workpiece 8b in front of the die, the support 1 with the turning clamp is driven through an adjustable distance in the direction of the arrow 96 by the returning press carriage, the turning clamp with the workpiece moving into a second position spaced from the front of the die 2. The support 1 is now so moved in its longitudinal direction that the turning clamp comes into a third position before the die 3, which corresponds to the second position in front of the die 2. By forward displacement of the press carriage 93, 94, and under the action of the springs 100, 102, the support 1 with the turning clamp 12 is brought into a position in front of the die 3 which corresponds to the first position in front of the die 2. In this position, the punch 5 pushes the workpiece 8b from the turning clamp 12 into the die 3, and when using a turning clamp according to FIGURE 3, this is effected against the pressure of the springs 24, and when using a turning clamp according to FIGURE 5, this is effected with positive opening of the clamping jaws.

The turning of the workpiece 8b takes place with the movement of the support 1 with the turning clamp 12 from the aforementioned second position into the third position.

The turning of the turning clamp is effected by a finite the front of the die 2. The support 1 is now so moved in rack 16, which meshes with a gearwheel 15 and rotates the gearwheel and thus the clamp spindle until one end of the rack strikes against a stop, or the turning movement is effected by appropriate control of the flow of pressurized media in the turning clamp according to FIGURES 13 and 14.

By the choice of the length of the rack and of the transmission of the rack gearing, the turning of the workpiece can take place through the entire travel from the second into the third position or can take place over a part of this travel. Similar circumstances apply as regards the control by means of the flow medium. It is shown from this that the turning movement can also be effected in a position between the centre lines of the two press punches, and in such a way that the workpiece can pass through the free space between the press punches, which can lead to a considerable reduction in the necessary width of the conveying space.

The return travel of the support 1 can in principle be effected similarly to the forward travel. However, the support 1 can make the return travel immediately in front of the dies (by a return movement staggered in time with respect to the movement of the press carriage), it also being necessary here to provide means for rotating the turning clamp back to its initial position during the return movement.

By virtue of the design of the arrangement as described, the said arrangement is of a very stable and rigid construction and, because of the adjustability of the stops 103, 104, of the setting rings 105, 106 and of the stops for the racks, and also because of the possibility of adjusting the time of supply of a pressurized medium as desired, the arrangement has a good capacity for being adapted to existing conditions and more especially for restricting the width of the conveying space to a minimum extent for a given size and more especially length of the workpiece.

When the workpiece, with the turning clamp as described above, is in practice held between clamping jaws which are movable relatively to one another and are under pressure, which jaws can be kept small in their dimensions in the die axis plane or a plan parallel to the latter and do not have to engage around a workpiece over the entire circumference thereof, the dimensions of the clamping jaws can be smaller than the dimensions of the workpiece itself. This means that only the dimensions of the workpiece in one plane, which is the same as the plane of the die axis or parallel to this latter plane, determine the necessary width of the conveying space.

However, also the arrangements of the turning clamps as described with positive opening and closing have all the features of the simplicity in design and in the conveying of forces, present low masses and forces due to inertia and render possible the use of a narrow conveying space, so that they represent an important technical advance in the design of such turning clamps.

I claim:

1. A work holding device for conveying workpieces between the dies and punches of at least two working stations of a press, in which the workpiece is moved from one position at a first station, to a relatively rotated position at a second station, comprising a support having two ends reciprocable in a given direction, a pair of clamping jaws mounted on said support in face-to-face relation having a common axis transverse to said given direction, means for reciprocating said support in said given direction, means for rotating at least one of said jaws about said axis, means releasably urging at least one of said clamping jaws towards the other clamping jaw to grip a workpiece, and adjustable means associated with said rotating means to control the angle through which said rotating means turn at least one clamping jaw.

2. A work holding device as set forth in claim 1 wherein said support comprises two parallel longitudinal spaced apart beams extending in said given direction, each of said beams carrying one of said clamping jaws.

3. A work holding device as set forth in claim 2 wherein means are provided for moving the support in a direction perpendicular to both said given directions and said common axis.

4. A work holding device as set forth in claim 3 wherein said means for moving the support are operatively connected to said means for reciprocating the support to move said support in one direction before the conveying reciprocating movement of said support and to move said support in the opposite direction after such conveying reciprocating movement.

5. A work holding device as set forth in claim 4 wherein the dies and punches of the press are mounted on a press carriage reciprocable to move said dies and punches relative to one another, and wherein said means for moving said support include at least one shaft passing through said carriage and carrying said support, and wherein means are provided for moving said shaft in said one direction and wherein abutment means are provided on said shaft to engage said carriage whereby when the press carriage is moved in the opposite direction it entrains said shaft and moves said support in said opposite direction.

6. A work holding device as set forth in claim 5 wherein said means for moving said support include two shafts passing through said carriage, one of said shafts having mounted thereon means for carrying one end of said clamp support, and means for reciprocating said clamp support, and the other of said shafts having mounted thereon a bearing for the other end of said clamp support.

7. A work holding device as set forth in claim 6, wherein said reciprocating means comprise a double acting, fluid pressure operated, piston and cylinder assembly.

8. A work holding device as set forth in claim 5 wherein said means for moving said shaft in said one direction include resilient means, in which energy is stored when said carriage moves in the opposite direction, such energy being released to move the shaft in said one direction.

9. A work holding device as set forth in claim 2 wherein a member is secured to each of said beams to extend in a direction transverse to both said given direction and said common axis, wherein each said member carries one of said clamping jaws at a position spaced from the associated beam, and wherein each said beam is rotatable about its longitudinal axis to move said clamping jaws towards and away from one another.

10. A work holding device as set forth in claim 9 wherein said means for rotating at least one of said clamping jaws comprises a gear connected to a clamping jaw for rotation therewith, a gear segment meshing with said gear and pivoted to said member and adjustable final stops positioned upon rotation of said beam to effect rotation of said gear and said clamping jaw.

11. A work holding device as set forth in claim 1, wherein said means for rotating at least one of said clamping jaws comprises a gear which is connected to said clamping jaw for rotation therewith, a rack meshing with said gear and constrained normally to move with said support and adjustable final stops positioned to engage said rack upon reciprocation movement of said support.

12. A work holding device as set forth in claim 1, wherein said means for rotating at least one of said clamping jaws comprises a fluid pressure operated motor connected to at least one of said clamping jaws, and adjustable stops effective to actuate the supply of fluid to said motor.

13. A work holding device as set forth in claim 1, wherein said means for rotating at least one of said clamping jaws comprises a threaded shaft secured against rotation with respect to at least one of said clamping jaws, a nonrotatable nut threaded on said threaded shaft, a double armed lever engaging with one of its arms against said nut, and fluid pressure operated piston means engaging the other arm of said lever to cause axial movement of said nut with respect to said threaded shaft.

14. A work holding device as set forth in claim 1, wherein a compression spring is provided for at least one of said clamping jaws to urge said jaw towards the other jaw.

15. A work holding device as set forth in claim 1, wherein said means for releasably urging said jaws towards one another comprise a lever pivoted to said support, one arm of said lever being operatively connected to said jaw, and an actuating element operatively connected to the other arm of said lever to cause axial reciprocation of said jaw upon actuation of said element.

16. A work holding device as set forth in claim 15 wherein said actuating element is a fluid operated piston means.

References Cited

UNITED STATES PATENTS

| | | | |
|---|---|---|---|
| 1,929,862 | 10/1933 | Wilcox | 10—12 |
| 2,074,104 | 3/1937 | Criley | 10—12 |
| 2,272,758 | 2/1942 | Wilcox et al. | 10—12 |
| 2,278,103 | 3/1942 | Friedman | 10—12 |
| 2,542,864 | 2/1951 | Friedman | 10—166 |
| 2,689,358 | 9/1954 | De Loe | 10—166 |
| 2,721,343 | 10/1955 | Friedman | 10—12 |
| 3,217,343 | 11/1965 | Barkocy | 10—166 |
| 3,295,701 | 1/1967 | Alexander | 10—12 |

CHARLES W. LANHAM, Primary Examiner

E. M. COMBS, Assistant Examiner

U.S. Cl. X.R.

10—12, 72, 76